May 23, 1972     W. A. VON LERSNER     3,664,555
MIXING AND DISPENSING UNIT
Filed Nov. 23, 1970     2 Sheets-Sheet 1
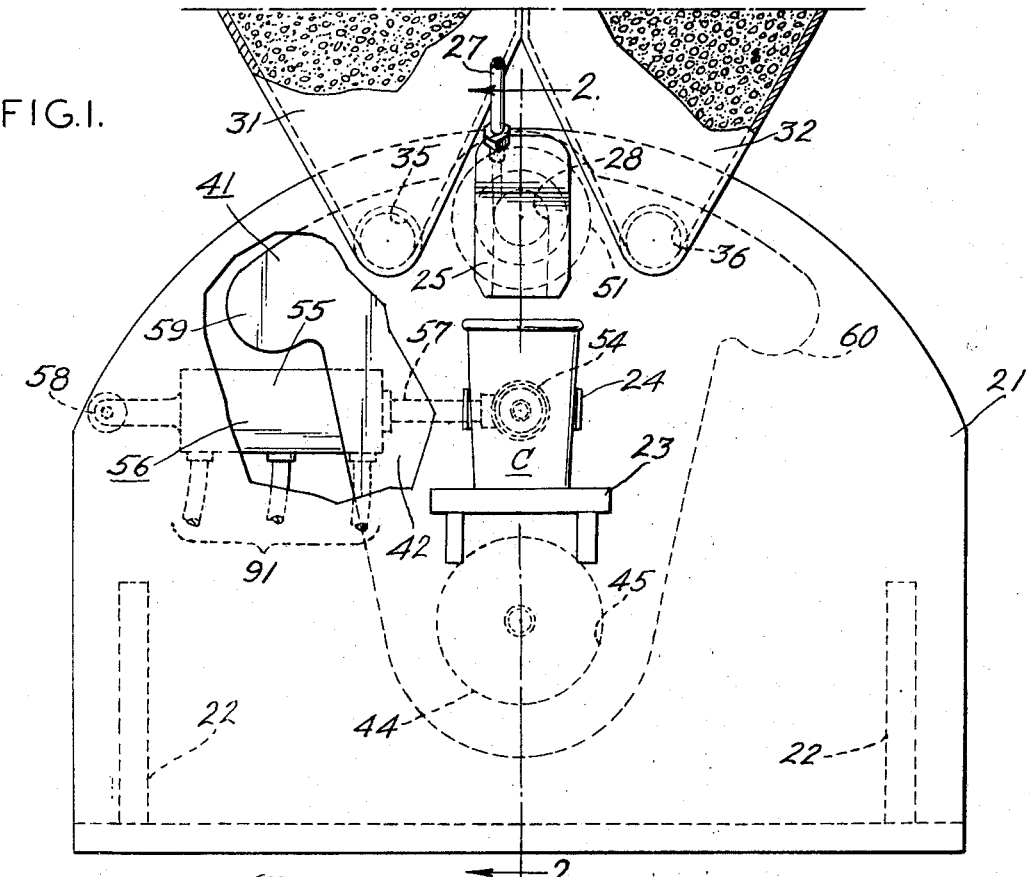
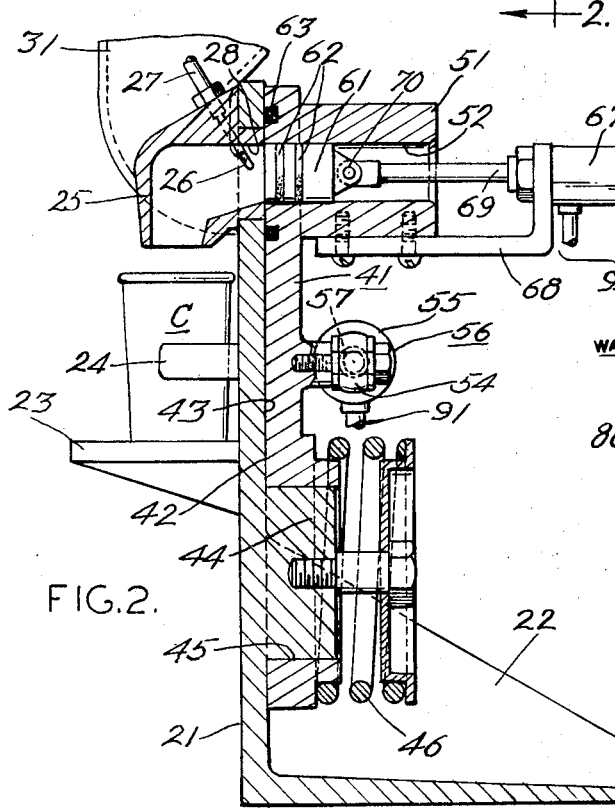
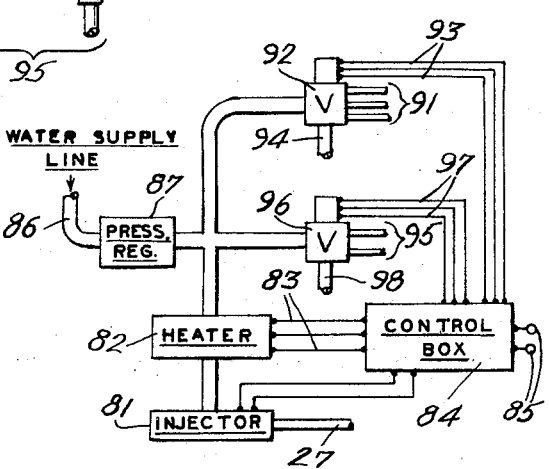
INVENTOR:
WOLF A. VON LERSNER
BY
ATTYS.

3,664,555
MIXING AND DISPENSING UNIT
Wolf A. von Lersner, Cherry Hill, N.J., assignor to Campbell Soup Company, Camden, N.J.
Filed Nov. 23, 1970, Ser. No. 91,872
Int. Cl. C01f 11/04
U.S. Cl. 222—145 — 8 Claims

ABSTRACT OF THE DISCLOSURE

A unit for mixing a metered quantity of a diluent with a metered charge of a concentrate and dispensing the combined ingredients. The unit includes two reservoirs for different concentrates and a common dispensing outlet with a displaceable element arranged to selectively withdraw a metered charge of concentrate from either of said reservoirs and to discharge the same through the outlet along with the diluent. The displaceable element includes an expandable chamber device, in one position operatively connected to one reservoir in a second position operatively connected to a second reservoir and in a third position intermediate said first and second positions operatively connected to said dispensing outlet. The diluent is added to the concentrate in such a manner as to thoroughly flush the chamber device and the dispensing outlet when the movable element is in registry with the dispensing outlet. The movable element also serves as a valve for the connections to the reservoirs and the dispensing outlet.

---

The present invention relates to a mixing and dispensing unit operable to combine a metered quantity of a secondary ingredient with a metered charge of a primary ingredient and to dispense the combined ingredients into a receiver. The invention has particular application to a mixing and dispensing unit which incorporates means for selecting between two different primary ingredients, such as two different types of soup concentrate.

In U.S. Pat. No. 3,584,268, issued May 21, 1968, apparatus is disclosed for combining a metered charge of soup concentrate with a metered charge of hot water to produce an individual portion of soup. In U.S. Pat. No. 3,550,814 a simplified embodiment of apparatus is disclosed including an alternate form in which a selection among plural reservoirs of the prime ingredient is provided. The present invention provides a simplified mixing and dispensing unit which is substantially trouble free in operation and is simple and convenient to maintain, both from a mechanical and from a sanitary viewpoint.

More particularly the present invention provides a unit having a novel arrangement of parts in a compact array which reduces the possibility for retention of product in the apparatus and facilitates the refrigeration of the primary ingredients.

The arrangement of parts also insures against cross-contamination of the primary ingredients while permitting dispensing of the alternate types of mixture through the same dispensing outlet.

The present invention also provides a machine which operates with standard supplies of water and electricity without installation of special supply lines.

All of the objects of the invention are more fully set forth hereinafter with reference to the accompanying drawing wherein:

FIG. 1 is a face view of a unit made in accordance with the present invention with portions broken away to more clearly illustrate the construction thereof;

FIG. 2 is a fragmentary vertical transverse sectional view taken on the line 2—2 of FIG. 1;

FIG. 3 is a diagram of a typical installation using standard water and electrical supplies;

Figure 4:
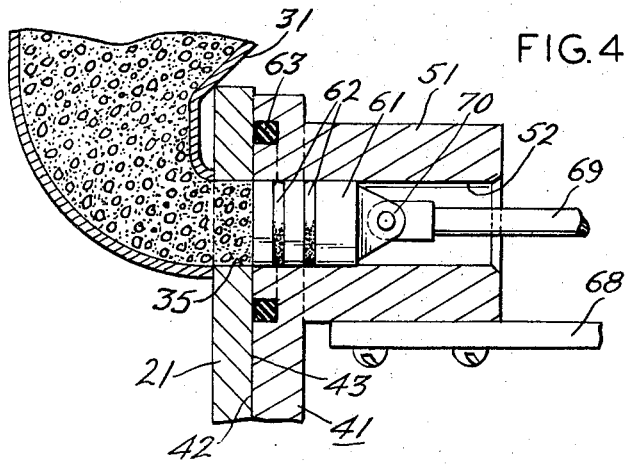
FIGS. 4, 5 and 6 are enlarged fragmentary transverse sectional views showing the loading of a predetermined charge of one ingredient to the cylinder and the dispensing of a mixture including that ingredient from the cylinder in successive stages.

Referring now to the drawing, the illustrated embodiment of the present invention includes a front plate 21 having support legs 22, 22 which assist in maintaining the front plate 21 upright as shown in FIGS. 1 and 2. A cup support 23 is provided on the outer face of the plate and a cup guide 24 serves to position a cup C on the support 23 underneath a dispensing spout 25 having a dispensing port 28 centrally positioned in the front plate 21. The dispensing spout 25 includes a tangential inlet jet 26 connected to a supply line 27 which serves to inject the secondary ingredient, such as hot water, through the port 28 into the dispensing spout 25 with a swirling motion.

A pair of reservoirs 31 and 32 for the primary ingredients are mounted to overlie the front plate 21 and have discharge ports 35 and 36 positioned in the front page 21 on respectively opposite sides of the dispensing port 28. It is noted that the bores of the ports 35 and 36 are equal in size to each other and also to the bore of the dispensing port 28.

In accordance with the primary feature of the present invention, a movable element 41 is mounted on the plate 21 to cooperate with the bores 35, 36 and 28 to provide a valving action. In the present instance, the movable element 41 comprises a plate member having an outer surface 42 complementary to the inner surface 43 of the front plate 21. The surfaces 42 and 43 are in sliding abutment and are machined to provide a sliding fit therebetween. The plates 21 and 41 are connected for pivotal movement on an axis perpendicular to the coplanar surfaces 42 and 43, for example by a boss 44 on the inner surface 43 of the plate 21 which is received in a recess 45 in the pivotal element 41. The surfaces 42 and 43 are maintained in sliding engagement by a spring bias at 46 having a seat at one end surrounding the recess 45 and a seat at the other end mounted on the boss 44.

Means is provided at the upper end of the movable pivotal element 41 to cooperate with the ports and provide the desired valving action. To this end, the movable element 41 has along its center line a rearward extension 51 having a cylindrical bore 52 therethrough which is positioned to register with the ports 35, 36, and 28. To this end, the ports 35, 36 and 28 in the plate 21 and the cylindrical bore 52 in the pivotal element 41 are all equidistant from the pivotal axis. Furthermore, for facilitating the design of the controls for displacing the pivotal element 41, the ports 33 and 34 are spaced equally from the port 28 so that the throw of the pivotal element 41 between the discharge port and the dispensing port is the same for both the reservoir 31 and the reservoir 32.

In order to displace the pivotal element 41 between positions wherein the open end of the cylindrical bore 52 is in registry with the respective ports 35, 36 and 28, an actuator 56 is connected to the pivotal element 41 as indicated at 54. The actuator 56 comprises a hydraulic cylinder 55 and a rod 57, the rod being connected to the pivotal element 41 and the cylinder being connected to the front plate 21 as indicated at 58. By means of the actuator, the pivotal member 41 is displaced to register the open end of the bore 52 with either of the discharge ports 35 and 36 or with the dispensing port 28. In order to provide a valving action which maintains the discharge ports 35 and 36 closed except when the open end of the bore 52 is in registry therewith, the pivotal element 41 has extended ears 59 and 60 which cover the ports 35 and 36 respectively when the pivotal element 41 is at its respective rightward and leftward limit positions as shown in FIG. 1.

The apparatus of the present invention provides for the dispensing of a metered charge of the primary ingredient from either one of the reservoirs 31 and 32. To this end, a piston 61 is slidably mounted in the cylindrical bore 52 so that when the open end of the bore 52 is in registry with the discharge port of one of the reservoirs, the piston 61 may be displaced within the bore 52 through a predetermined stroke so as to withdraw from the reservoir to which it is connected a metered charge of the primary ingredient. Suitable sealing means are provided at 62 on the piston 61 and at 63 around the bore 52 to prevent leakage of the material into the clearances provided by the sliding fit between the surfaces 42 and 43 and between the piston 61 and the bore 52.

In order to displace the piston 61 through a predetermined stroke, a hydraulic actuator 66 is connected to the piston 61. The actuator 66 comprises a hydraulic cylinder 67 which is mounted on the extension 51 as indicated at 68 and a piston rod 69 which is connected to the piston as indicated at 70. An adjusting device is provided at 71 to regulate the stroke of the actuator 66.

The supply line 27 to the injector jet 26, and the hydraulic actuators 56 and 66 are adapted to be connected to the conventional water supply line at the installation site, and are controlled electrically from a conventional electrical source. For example, as shown in FIG. 3, the injector line 27 is connected to a metering injector 81 which is fed from a heated reservoir 82 having electrical connections 83 to an electrical control box 84 connected to the electrical main as indicated at 85. The control box has a suitable thermostatic conrtol for maintaining the temperature of the water for the injector at approximately 200° F. Make-up water is supplied to the heated reservoir 82 from a water supply line 86 which may have a conventional pressure regulating device 87 therein. The hydraulic actuator 56, on the other hand, is provided with three hydraulic lines 91 which are connected to the supply line 86 and a drain 94 through a valve 92 having electrical connections at 93 to the control box 84. In like manner, the hydraulic lines 95 for the actuator 66 are also connected to the supply lines 95 for the actuator 66 are also connected to the supply line 86 and a drain 98, for example through a valve 96 which has electrical connections 97 to the control box 84.

Figure 5:
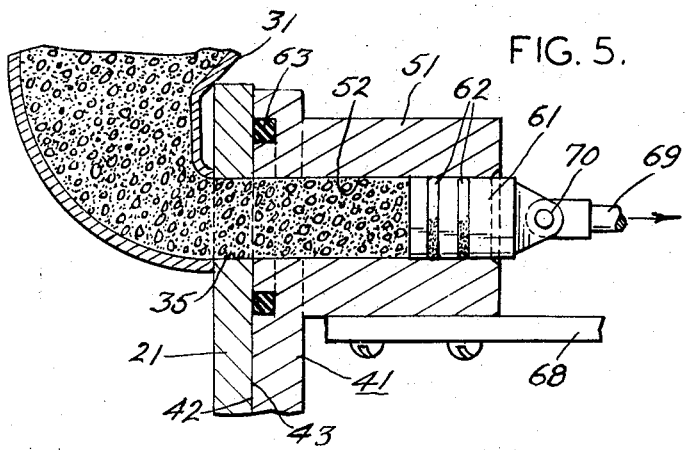
Figure 6:
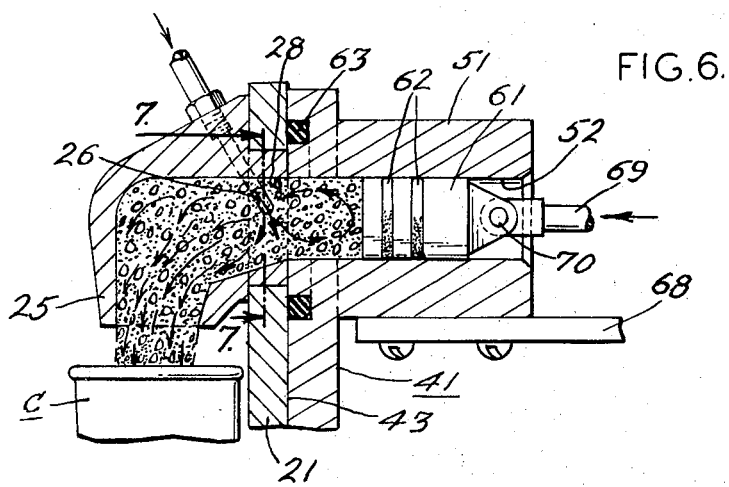
Figure 7:
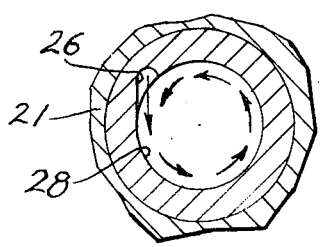
FIG. 7 is a local sectional view taken on the line 7—7 of FIG. 6.

Conventional switching mechanism is provided in the control box 84 to selectively actuate the actuators 56 and 66 to perform the desired functions. For example, when the control box is set to dispense a mixture including the primary and secondary ingredients from the reservoir 31 and the injector 81 respectively, the actuator 56 is first operated to displace the pivotal element 41 from the home position illustrated in FIG. 1 to the lefthand limit position wherein the open end of the cylindrical bore 52 is in registry with the port 35 for the reservoir 31 (see FIG. 4). When the pivoted element 41 reaches its lefthand limit position in registry with the discharge port 35, the actuator 56 is arrested and the actuator 66 is then operated to withdraw the piston 61 to receive within the bore 52 a metered charge of the primary ingredient from the reservoir 31 (see FIG. 5). At the completion of the charging stroke of the piston 61, the actuator 66 is arrested and the actuator 56 is again operated to reposition the pivoted member 41 in its home position wherein the bore 52 is in registry with the dispensing port 28 (see FIG. 6). When the member 41 has reached its home position, the metering injector 81 is energized and the actuator 66 operates to return the piston 61 to its normal home position closing the open end of the bore 52 thereby discharging the metered charges of the primary and secondary ingredients through the dispensing nozzle 25 and into the cup C. The injector 81 injects a metered charge of diluent, i.e. hot water, in a swirling motion within the dispensing port 28 controlled to insure continued flow of hot water following the attainment of the home position by the piston 61 so that the hot water operates to flush any particles of the primary ingredient from the dispensing nozzle and the piston face. The cycle is then complete with the piston 61 closing the open end of the bore 52 and the pivoted member 41 at rest in a position to register the open end of the bore 52 with the dispensing port 28. A similar sequence of operation occurs when the ingredient from the other reservoir 32 is selected, but the actuator 56 operates to displace the pivoted member 41 to its righthand limit position.

While a particular embodiment of the present invention has been herein illustrated and described, it is not intended to limit the invention to such disclosure but changes and modifications may be made therein and thereto within the scope of the following claims.

I claim:

1. In apparatus for mixing and dispensing a mixture of ingredients wherein the ingredients are introduced into the mixture in successive charges, said apparatus comprising means to supply a primary ingredient, a second means to supply a secondary ingredient, a movable element having a bore therein to receive said ingredients, a piston in said bore mounted for longitudinal displacement in one direction at a charging station to receive a predetermined charge of said primary ingredient and thereafter in the opposite direction at a dispensing station to discharged said charge, means to inject a predetermined charge of said secondary ingredient into said predetermined charge of the primary ingredient under sufficient pressure to effect an inter-mixture of said charges, said device including a stationary element having a bearing wall, said movable element being mounted for displacement relative to said stationary element with the open end of said bore slidably engaging said wall between said charging and dispensing stations, said wall having a dispensing port at said dispensing station adapted to register with the open end of said bore when said element is in a discharging position, the improvement wherein the supply means for said primary ingredient comprises a pair of reservoirs, each reservoir having a discharge port opening through said bearing wall and adapted to register with the opend end of said bore when said element is at a charging station associated with said reservoir, said bearing wall provided an uninterrupted bearing surface intermediate each discharge port and said dispensing port to provide a closure for open end of said cylindrical bore during displacement of said element between said discharge port and said dispensing port, said supply means for the secondary ingredient comprising an injector jet within said dispensing port operable to flush said dispensing port and the face of said piston when said cylindrical bore is in registry with said dispensing port.

2. Apparatus according to claim 1 wherein said dispensing port is equidistant from and is disposed between said two discharge ports.

3. Apparatus according to claim 1 including a hydraulic actuator for displacing said piston in said bore, a second hydraulic actuator for displacing said movable element, and means connecting said two hydraulic actuator and said liquid injector to a common supply of water, said hydraulic actuators having control means therefor connected to and controlled by a common control box.

4. Apparatus according to claim 1 including control means operable sequentially to position said movable element in a home position at said dispensing station, to displace said element to register its bore with a selected one of said two discharge ports, to displace said piston in a charging stroke, to return said movable element to its home position and to displace said piston in a dispensing stroke concurrently with the energization of said secondary ingredient supply means.

5. Apparatus according to claim 1 wherein said secondary ingredient supply means comprises a metering injector energizable to inject a metered charge of hot water into said dispensing port tangentially with sufficient force to intermix with the primary ingredient being dispensed from said bore.

6. Apparatus accordinng to claim 1 wherein said movable element has a confronting wall operable to slidably engage the bearing wall and to close each of said ports in said wall when said cylindrical bore passes out of registry with the port.

7. Apparatus according to claim 6 wherein said bearing wall and the confronting wall are substantially coplanar in sliding engagement with each other, said movable element being mounted for pivotal movement about an axis perpendicular to said coplanar walls.

8. Apparatus according to claim 7 wherein all of said ports and the open end of said cylindrical bore are equally distant from pivotal axis.

References Cited
UNITED STATES PATENTS

| | | | |
|---|---|---|---|
| 3,096,914 | 7/1963 | Kerr | 222—409 |
| 3,550,814 | 12/1970 | Von Lersner | 222—145 |

ROBERT B. REEVES, Primary Examiner

T. E. KOCOVSKY, Assistant Examiner

U.S. Cl. X.R.

222—409